Patented Feb. 15, 1938

2,108,113

UNITED STATES PATENT OFFICE 2,108,113

PROCESS OF PRODUCING CONDENSATION PRODUCTS OF METHYLOL COMPOUNDS OF UREA

Karl Eisenmann, Ludwigshafen-on-the-Rhine, and Hans Scheuermann, Oggersheim, Germany, assignors, by mesne assignments, to Plaskon Company, Incorporated, Toledo, Ohio, a corporation of Delaware No Drawing. Application November 3, 1934, Serial No. 751,414. In Germany November 10, 1933

12 Claims. (Cl. 260—3)

The present invention relates to condensation products of methylol compounds of urea and a process of producing same.

In U. S. Patent 2,043,159 there is described and claimed a process of producing urea-formaldehyde condensation products according to which the products obtainable by condensation, preferably in the presence of acid condensing agents, of urea and/or thiourea with formaldehyde or its polymers, or of methylol derivatives of urea and/or thiourea or alkyl ethers thereof, or of amorphous products of high molecular weight obtainable from the said methylol compounds by splitting off water, or of mixtures of the said substances with an addition of at least 50 per cent by weight of a monohydric alcoholic solvent (i. e. a solvent containing one free alcoholic hydroxyl group in which by means of the condensation itself the condensation products are dissolved, solvents of this kind being for example aliphatic alcohols containing up to six carbon atoms in the molecule, ethylene glycol mono-alkyl or aryl ethers or benzyl alcohol) calculated on the amount of the said substances or mixtures thereof, are subjected to condensation in at least 50 per cent by weight, calculated on the amount of the said substances or mixtures thereof, of esters of fatty acids containing at least 10 carbon atoms with a polyhydric alcohol one hydroxyl group of this polyhydric alcohol being unesterified, any excess of the alcoholic solvent being driven off, the reaction mixture neutralized if necessary and the reaction products so obtained are heated to between about 80° and about 130° C. until they have become soluble in non-alcoholic solvents, as for example in hydrocarbons, esters and ketones of high molecular weight. Instead of starting with condensation products first prepared in the presence of a monohydric alcoholic solvent, the process according to U. S. Patent 2,043,159 may be carried out by condensing the initial materials more particularly described above, preferably in the presence of acid condensing agents, in at least 50 per cent by weight of the monohydric alcoholic solvent and at least 50 per cent by weight of the said esters of fatty acids with a polyhydric alcohol one hydroxyl group of which remains unesterified, the condensation products being worked up in the same manner as described above. If desired these products may be subjected to a hardening treatment by heating.

We have now found that products showing quite similar properties to those obtained in accordance with the above process are produced by using instead of the said esters of fatty acids containing at least 10 carbon atoms with a polyhydric alcohol one hydroxyl group of which remains unesterified, aliphatic saturated or unsaturated alcohols of high molecular weight. As alcohols of high molecular weight may be employed all alcohols with more than eight carbon atoms in the molecule. Naturally occurring alcohols such as cetyl or myricyl alcohol or the alcohols contained in Montan wax or those obtainable by hydrogenation of natural saturated or unsaturated fatty or wax acids are of special practical importance. For the said hydrogenation may be employed the acids contained in animal or vegetable fats, oils or waxes, as for example in beef tallow spermaceti, sperm oil, palm kernel oil, linseed oil, poppy oil, castor oil, coconut oil, beeswax, Japan wax or carnauba wax or also in Montan wax. The alcohols obtainable by hydrogenation from the fatty acids resulting from the oxidation of paraffin wax by means of air or the alcohols obtained directly in the said oxidation may also be employed. Mixtures of two or more of the said alcohols may also be employed.

The proportions of the urea resin component (A) on the one hand and of the alcohols of high molecular weight (B) on the other hand may be varied within wide limits. With the variation in the composition, the properties of the resulting resins vary more or less; a resin derived from 1 part of A and 1 part of B has more the properties of B, i. e. the alcohol employed, than a resin derived from 4 parts of A and 1 part of B, in which the properties of the urea resin, as for example as regards hardness, preponderate. With the said variation in the resin properties, there is a corresponding variation in the solubility properties. While resins from 1 part of A and 1 part of B have practically all the solubility properties of the alcohols of high molecular weight employed and are thus also soluble in aliphatic hydrocarbons at least while warming, when employing alcohols containing more than 15 carbon atoms in the molecule, resins from 3 parts of A and 1 part of B show a marked reduction in this solubility but are still readily soluble in aromatic, hydroaromatic and chlorinated hydrocarbons as well as in esters or ketones of high molecular weight. The resins prepared with the aid of alcohols obtainable from Montan or carnauba wax are only soluble in the said solvents while heating. The influence of the molecular weight of the alcohols employed in this process on the properties of the compositions as regards their solubility in organic solvents may be seen from the following data:

Resins prepared with the aid of saturated alcohols containing from 8 to about 18 carbon atoms in the molecule are soluble at room temperature in practically all proportions of A:B in aromatic hydrocarbons, esters or ketones of high molecular weight, the resins prepared with the aid of alcohols containing more than 15 carbon atoms in the molecule being also soluble in aliphatic hydrocarbons, while warming to from about 50° to about 80° C. Resins from 1 part of A and 1 part of saturated alcohols containing from about 18 to about 25 carbon atoms in the molecule are soluble in aliphatic hydrocarbons while warming. Furthermore, these resins and also the resins prepared from 2 parts of A and 1 part of these alcohols are soluble in aromatic hydrocarbons, esters or ketones of high molecular weight while slightly warming. In the proportion of 3 parts of A and one part of B these resins are not soluble in aliphatic hydrocarbons but are soluble even at room temperature in the usual solvents as for example in aromatic hydrocarbons, esters, ketones of high molecular weight and in chlorinated hydrocarbons. Resins prepared with the aid of saturated alcohols containing more than about 25 carbon atoms in the molecule are in practically all proportions of A:B insoluble in the said usual solvents at room temperature, but are dissolved in these solvents except aliphatic hydrocarbons, while heating to from about 60° to about 90° C.

When using unsaturated alcohols of high molecular weight, such as for example, oleyl alcohol, the solubility of the resins at room temperature is increased. The mechanical properties of the products also vary according to the ratio of A:B, the higher the content of B, especially when employing alcohols which are liquid or soft in the cold, the softer the resins and vice versa.

The resins may be worked up alone or together with cellulose esters or ethers, as for example nitrocellulose or benzylcellulose, and the usual softening agents or together with drying oils to form lacquers or adhesives the solvents or diluents of which may consist of esters, ketones and hydrocarbons alone.

Such lacquers leave behind on the substratum, after drying, lustrous highly elastic films of good adhesion and resistance against water and, after hardening at elevated temperatures for example at from about 80° to about 150° C., also against organic solvents. The lacquers obtained by dissolving the said condensation products together with drying oils, as for example linseed oil varnish, in oil of turpentine are distinguished as compared with ordinary linseed oil varnishes in that they dry more rapidly and very quickly become hard when heated to 100° C.

It is also possible, especially by employing resins derived from 1 to 2 parts of A and 1 part of B to prepare cast articles having excellent waterproof properties after the addition of a suitable acid or acid-forming hardening agent, such as phthalic anhydride. These products harden very well by heating and thus yield glass-clear colorless to yellow masses having remarkable strength, the properties of which masses may be varied within wide limits by the addition of varying quantities of suitable softening agents, as for example dibutyl phthalate, tricresyl phosphate, glycerine-trihydroxy-ethyl ether. The hardened products are suitable inter alia as substitutes for inorganic glass.

If the products obtained according to this invention be kneaded on rollers while heating, preferably at from 80° to 90° C. and if desired while adding a hardening agent, until they become hard and brittle in the cold, they may be pressed, after grinding, to form homogeneous transparent articles in a press at from 120 to 140° C. under a pressure of from about 50 to about 250 kilograms per square centimeter. The glass-clear pressed articles thus obtained have good mechanical strength and good waterproof properties.

Before casting or during the rolling there may be added to the resins, softening agents, dyestuffs or fillers of organic or inorganic nature. Even rubber may be incorporated on the rollers with the formation of more or less plastic masses or masses capable of being hardened.

The condensation itself is carried out in a manner analogous to that described in U. S. Patent 2,043,159. The alcohols of high molecular weight are advantageously, as is usually the case in the said specification, employed together with the monohydric alcoholic solvents. It is also possible, however, to cause for example a urea-formaldehyde condensation product prepared in butyl alcohol to react, after removal of the excess of solvent with an alcohol of high molecular weight or a mixture of such alcohols by subsequent further heating. In the process according to this invention this reaction probably also is based on an etherification or a re-etherification.

The amount of alcohols of high molecular weight preferably amounts to not less than 20 per cent by weight of the urea-formaldehyde condensation products, while of the alcoholic solvent not substantially less than 50 per cent by weight of the urea-formaldehyde condensation products are employed.

The heat-treatment of the resin which takes place after the expelling of the solvent according to U. S. Patent 2,043,159 and which leads to the solubility of the product in hydrocarbons is limited to a minimum as regards time according to the present invention, i. e. when employing alcohols of high molecular weight. In some cases the solubility in hydrocarbons, esters or ketones is almost reached at the moment at which the last fraction of the monohydric alcoholic solvent is expelled so that the after treatment must only be carried on for a rather short time. By a further heat-treatment, however, it is possible to ensure that the resin will have a greater hardness in the cold.

The resins according to this invention are all clear when hot but when saturated alcohols containing more than 15 carbon atoms in the molecule have been employed they solidify at room temperature to give opaque masses. Unsaturated alcohols, however, yield as a rule clear resins. After hardening at 80° C. or more the opaque resins also become glass-clear. Films of such resins behave in a similar manner.

The following examples will further illustrate how the said invention may be carried out in practice but the invention is not restricted to these examples.

*Example 1*

100 grams of a mixture of alcohols obtained from the acids contained in palm kernel oil by subjecting said acids to the action of hydrogen at a temperature of from 120 to 400° C. and a pressure of at least 30 atm. in the presence of an activated hydrogenation catalyst according to the Otto Schmidt application Ser. No. 527,060 filed April 1, 1931 are dissolved at ordinary temperature in a mixture of 300 grams of butanol and 50 grams of ethyl alcohol, 15 cubic centimeters of a 5 per cent solution of urea nitrate in ethyl alcohol being added. The solution is heated to 90° C. and 300 grams of dimethylolurea are introduced while stirring. The dimethylolurea gradually dissolves with the formation of a resinous condensation product. The temperature is kept at from 90° to 93° C. while stirring well during the condensation. After about from 3 to 4 minutes a clear solution is obtained which after about from 6 to 8 minutes is neutralized by the addition of 20 grams of tertiary sodium phosphate. By cooling, the sodium phosphate separates out; it is filtered off and the excess of normal butyl alcohol together with the water formed during the reaction are expelled from the clear solution in a vacuum kneading machine under a pressure of 80 millimetres (mercury gauge) and at a temperature of the reaction mixture of from 85° to 95° C.

The remaining almost colorless resin is then further kneaded for about an hour at the same temperature in vacuo. It dissolves in an equal amount of toluene to give a clear somewhat viscous solution which yields slightly turbid films at room temperature. By hardening for from 10 to 15 hours at 105° C., the films become clear and very hard.

*Example 2*

100 grams of the fraction of the mixture of alcohols employed in Example 1, which passes over up to 200° C. under a pressure of 15 millimeters (mercury gauge) and which consists chiefly of alcohols containing from 12 to 14 carbon atoms in the molecule, are dissolved at ordinary temperature in 300 grams of ethyl alcohol and 15 grams of a 5 per cent solution of urea nitrate are added. The solution is then heated to boiling and 300 grams of dimethylolurea are introduced while stirring. After about 8 minutes, 20 grams of tertiary sodium phosphate are added to the solution and the latter filtered after cooling.

The filtrate is worked up as described in Example 1. After expelling the solvent and the water formed during the reaction the product is kneaded for about 4 hours in vacuo at between 90° and 95° C., a resin being formed which, when dissolved in toluene, yields films which at room temperature are clear and no longer sticky.

A lacquer prepared from this resin together with nitrocellulose leaves behind, after drying, highly lustrous films of good adhesion and elasticity.

*Example 3*

100 grams of the mixture of alcohols obtainable from palm kernel oil fatty acids in the manner set out in Example 1 are dissolved at ordinary temperature in a mixture of 300 grams of butanol and 50 grams of ethanol, 15 cubic centimeters of a 5 per cent solution of urea nitrate in ethanol being added. The solution is heated to 90° C. and 150 grams of dimethylolurea are introduced while stirring. The reaction mixture is further worked up in the manner described in Example 1. The resin obtained yields solutions of specially low viscosity when dissolved in toluene. A solution of 2 parts of this resin and 1 part of linseed oil in from 2 to 3 parts of oil of turpentine leaves behind, after drying, a clear film which rapidly becomes non-sticky and which dries very rapidly at about 100° C.

If a hardening agent, as for example from 0.5 to 1 per cent of phthalic anhydride, be added to the said resin in the kneading machine, kneading being carried on for further 5 minutes under a vacuum, a resin is obtained which is more viscous but still quite readily flowable when hot and which after being poured into moulds may be hardened at from 80° to 105° C. in from 10 to 14 days to form glass-clear, practically colorless, entirely bubble-free articles. Contrasted with the urea glass hitherto known, such bodies are capable of withstanding boiling in water for half an hour without the slightest alteration during or after the boiling.

If the resin be rolled at about 80° C. with an addition of from 0.5 to 1 per cent of phthalic anhydride until it becomes hard and brittle when cold, there is obtained after grinding, if desired with an addition of a further stronger hardening agent, as for example from 0.5 to 1 per cent of oxalic acid, a moulding powder which may be pressed at from 120° to 140° C. under a pressure of 200 kilograms per square centimeter to yield glass-clear plates which may serve as a substitute for glass. The water-proof properties and hardness of the said plates may be still further improved by further hardening for from 6 to 10 days at from 80° to 110° C. A filler, as for example cellulose, may also be mixed with the moulding powder. In this manner transparent pressed products are obtained.

*Example 4*

100 grams of the alcohols of high molecular weight obtained from crude Montan wax (for example by steam distillation under reduced pressure from the unsaponifiable constituents remaining after the saponification of crude Montan wax) are dissolved at 90° C., in 360 grams of a 42 per cent solution of a urea-formaldehyde condensation product in butyl alcohol obtained according to the U. S. Patent No. 2,019,865. The free butyl alcohol is distilled off in a kneading machine at 90° C. under a pressure of 80 millimeters (mercury gauge), the residue being kneaded for a further hour at the same temperature and pressure. A yellowish resin remains behind which is readily soluble in hot toluene but which separates out again on cooling. A film prepared from the hot resin solution is turbid in the cold but becomes clear after hardening for 10 hours at 105° C. The hardened film is slightly yellowish and very resistant to water.

The cast articles obtained from this resin in the manner described in Example 3 yield, after hardening for from 10 to 14 days at from 80° to 105° C., glass-clear but slightly yellow colored products of great strength and resistance to boiling water.

*Example 5*

65 grams of paraformaldehyde are dissolved while heating at from 50° to 60° C. in a mixture of 250 grams of butanol and 50 grams of ethyl alcohol to which has been added 1 gram of 10 per cent caustic soda solution, the caustic soda then being neutralized with hydrochloric acid. After adding 0.2 gram of magnesium carbonate, 60 grams of urea are added at 90° C. while stirring well. After heating for two minutes at the same temperature, 20 cubic centimeters of 5 per cent alcoholic urea nitrate solution are added, the whole being stirred at the same temperature for a further 10 minutes. Then 75 grams of oleyl alcohol, prepared from sperm oil according to the process of the U. S. Patent No. 1,965,566 are added. After a further 5 minutes 15 grams of tertiary sodium phosphate are added, while stirring vigorously, to the solution at a temperature of 90° C., the whole then being cooled to room temperature and filtered.

A clear solution thus obtained is freed from solvent and water formed during the reaction in a kneading machine by raising the temperature to from 85° to 95° C. at a pressure of 80 millimeters (mercury gauge), the residue being kneaded for another 2 hours under the same conditions. A honey-yellow resin, somewhat sticky when cold, is obtained which dissolves readily in butyl acetate or toluene and is well compatible with nitrocellulose.

Example 6

75 grams of octodecyl alcohol, prepared by subjecting stearic acid to the action of hydrogen at a temperature of 225° C. and under a pressure of 200 atm. in the presence of an activated cobalt catalyst, are dissolved as described in Example 4, in 520 grams of the 42 per cent solution of a urea-formaldehyde condensation product in butyl alcohol described therein and further worked up as described therein.

A resin which is hard and brittle in the cold is obtained which dissolves readily in butyl acetate, toluene or cyclohexanone but which yields colorless turbid films upon evaporation of the solvent. The films become clear and completely waterproof by hardening at 105° C. for 10 hours or, if 1 per cent of phthalic anhydride (with reference to the resin) be previously added to the solution, even for 2 hours.

Example 7

100 grams of octodecane-diol, prepared by subjecting castor oil at a temperature of 220° C. to the action of hydrogen under a pressure of 45 atm. in the presence of an activated cobalt catalyst, are dissolved in 480 grams of the 42 per cent solution of a urea-formaldehyde condensation product in butyl alcohol described in Example 4 and further worked up in the manner described therein. The resin, which still flows very well, obtained after expelling the butyl alcohol and kneading for further 2 hours at a pressure of 80 millimeters (mercury gauge) has added thereto 3.4 grams of phthalic anhydride; it is then kneaded for 5 minutes at 90° C. under the same vacuum, poured into moulds and hardened for from 10 to 14 days at a temperature rising from 80° to 105° C. A clear, practically colorless cast article which can be readily worked mechanically and which is free from bubbles is obtained.

Example 8

100 grams of the fraction boiling up to 200° C. at 15 millimeters (mercury gauge) of the mixture of alcohols employed in Example 1 are kneaded at 80 millimeters (mercury gauge) for 1 hour at from 85° to 95° C. in a kneading machine with 150 grams of a resin obtained by condensation of dimethylolurea in butanol according to the U. S. Patent 2,019,865 and freed from excess of solvent according to U. S. Patent No. 1,889,791. A water-clear, readily flowing resin is obtained, which after the addition of 0.5 per cent of phthalic anhydride and pouring into moulds, hardens in from 10 to 14 days at from 80° to 110° C. giving glass-clear articles.

Example 9

60 grams of urea are dissolved in a mixture of 220 grams of 30 per cent formaldehyde and 150 grams of butanol. After adding 0.2 gram of magnesium carbonate, the reaction mixture is heated to 70° C. for 5 minutes while stirring, filtered, mixed with 30 grams of toluene and dehydrated in a kneading machine at from 55° to 60° C. at a pressure of 80 millimeters (mercury gauge), whereby the non-aqueous fraction of the distillate which separates into two layers is continuously led back into the boiling liquid. After from 130 to 140 cubic centimeters of water have been distilled off, the solution has added thereto 10 cubic centimeters of a 5 per cent solution of urea nitrate in ethyl alcohol, the pressure being increased to such an extent that the temperature rises from about 50° to 80° C. After from about 2 to 3 minutes the solution which was previously turbid becomes clear. The pressure is then reduced to such an extent that the temperature in the interior falls again to from 50° to 60° C., distillation then being continued for about half an hour until in all about 175 cubic centimeters of water have been distilled off.

There are then added to the solution 60 grams of the fraction of the alcohol mixture employed in Example 1 which passes over up to 200° C. at a pressure of 15 millimeters (mercury gauge) and then 10 grams of tertiary sodium phosphate, the solution being cooled, filtered, again returned to the kneading machine and worked up as described in Example 1.

After expelling the solvent, the product is kneaded for 2 hours at a pressure of 80 millimeters (mercury gauge) at about 85° C. A clear, readily flowing resin remains behind which can be worked up to cast or pressed articles or lacquers according to Example 3.

Example 10

100 grams of the octodecyl alcohol employed in Example 6 are dissolved in a mixture of 300 grams of butanol and 50 grams of ethyl alcohol. Then, a mixture of 75 grams of dimethylol urea and 75 grams of dimethylolthiourea is added to this solution, and condensation is effected in a manner corresponding to that described in Example 1. After expelling the solvent and the water formed during the reaction in a vacuum kneading machine at a pressure of 80 millimeters (mercury gauge) at from about 85° to 90° C. and further kneading for about one hour under the said conditions, 1.8 grams of phthalic anhydride are added, the whole being kneaded for further 5 minutes at from 85° to 95° C. and at the same pressure. The resin is then poured into moulds and hardened for about 14 days at from 80° to 105° C.

The cast articles obtained are water-clear, practically colorless and have good mechanical properties and great stability to water.

Instead of the said mixture of dimethylol urea and dimethylol thiourea, the corresponding amount of dimethylol thiourea alone may be employed the resins thus formed being somewhat softer.

The term "aliphatic alcohol" appearing in the specification and claims is designed to cover only those aliphatic compounds usually classed as alcohols, namely substances which contain besides the OH-groups only aliphatic hydrocarbon radicles.

What we claim is:

1. The process of producing a resinous condensation product from a methylol compound of a urea which comprises subjecting said methylol compound to an acid condensation in a monohydric alcoholic solvent containing up to 6 carbon atoms in the presence of an aliphatic alcohol containing more than 8 carbon atoms in its molecule, neutralizing the reaction mixture, expelling the solvent and heating the remaining resinous product to between about 80° and about 130° C. until it has become soluble in aromatic hydrocarbons.

2. The process of producing a resinous condensation product from a methylol compound of a urea which comprises subjecting said methylol compound to an acid condensation in a monohydric alcoholic solvent containing up to 6 carbon atoms in the presence of an aliphatic alcohol containing more than 8 carbon atoms in its molecule, neutralizing the reaction mixture, expelling the solvent under a simultaneous mechanical treatment and heating the remaining resinous product to between about 80° and about 130° C. until it has become soluble in aromatic hydrocarbons.

3. The process of producing a resinous condensation product from a methylol compound of a urea which comprises subjecting said methylol compound to an acid condensation by heating in compound to at least 50 per cent its weight of a monohydric alcoholic solvent containing up to 6 carbon atoms in the presence of at least 20 per cent, by weight of said methylol compound, of an aliphatic alcohol containing more than 8 carbon atoms in its molecule, neutralizing the reaction mixture, expelling the solvent and heating the remaining resinous product to between about 80° and about 130° C. until it has become soluble in aromatic hydrocarbons.

4. The process of producing a resinous condensation product from a methylol compound of a urea which comprises subjecting said methylol compound to an acid condensation in a monohydric alcoholic solvent containing up to 6 carbon atoms in the presence of the alcohols obtained by hydrogenation of the acids of palm kernel oil, neutralizing the reaction mixture, expelling the solvent and heating the remaining resinous product to a temperature of between about 80° and about 130° C. until it has become soluble in aromatic hydrocarbons.

5. The process of producing a resinous condensation product from a methylol compound of a urea which comprises subjecting said methylol compound to an acid condensation in a monohydric alcoholic solvent containing up to 6 carbon atoms in the presence of the alcohols obtainable by saponifying Montan wax, neutralizing the reaction mixture, expelling the solvent and heating the remaining resinous product to a temperature of between about 80° and about 130° C. until it has become soluble in aromatic hydrocarbons.

6. The process of producing a resinous condensation product from a methylol compound of a urea which comprises subjecting said methylol compound to an acid condensation in a monohydric alcoholic solvent containing up to 6 carbon atoms in the presence of octodecane-diol, neutralizing the reaction mixture, expelling the solvent and heating the remaining resinous product to a temperature of between about 80° and about 130° C. until it has become soluble in aromatic hydrocarbons.

7. The process of producing a resinous condensation product from a methylol compound of a urea which comprises heating to a temperature of between about 80° and about 130° C. the product, obtained by an acid condensation of said methylol compound in a monohydric alcoholic solvent containing up to 6 carbon atoms, neutralization of the reaction mixture and expulsion of the excess of said monohydric alcoholic solvent, with an aliphatic alcohol containing more than 8 carbon atoms in its molecule until the resulting product has become soluble in aromatic hydrocarbons.

8. Solid, from colorless to brown resinous reaction products of a condensation product of a methylol compound of a urea and a monohydric alcoholic solvent containing up to 6 carbon atoms with an aliphatic alcohol containing more than 8 carbon atoms in its molecule, which are soluble in aromatic hydrocarbons.

9. The products defined in claim 8 wherein the methylol compound of a urea is dimethylol urea.

10. The products as defined in claim 8, wherein the methylol compound of a urea is dimethylol thiourea.

11. Solid, from colorless to brown resinous condensation products of a methylol compound of a urea produced by subjecting a methylol compound of a urea to an acid condensation in the presence of a monohydric alcoholic solvent containing up to 6 carbon atoms and of an aliphatic alcohol containing more than 8 carbon atoms, neutralizing the reaction mixture, expelling the said alcoholic solvent and heating the remaining resinous product to a temperature between about 80° and about 130° C. until it has become soluble in aromatic hydrocarbons.

12. Solid, from colorless to brown resinous condensation products of a methylol compound of a urea produced by subjecting a methylol compound of a urea to an acid condensation in the presence of a monohydric alcoholic solvent containing up to 6 carbon atoms, neutralizing the reaction mixture, expelling the said alcoholic solvent and heating to a temperature between about 80° and about 130° C., the product thus obtained with an aliphatic alcohol containing more than 8 carbon atoms until the product has become soluble in aromatic hydrocarbons.

KARL EISENMANN.
HANS SCHEUERMANN.